United States Patent
Nagai et al.

(10) Patent No.: US 10,287,972 B2
(45) Date of Patent: May 14, 2019

(54) ACTUATOR FOR LINK MECHANISM FOR INTERNAL COMBUSTION ENGINE

(71) Applicant: HITACHI AUTOMOTIVE SYSTEMS, LTD., Hitachinaka-shi, Ibaraki (JP)

(72) Inventors: Kishiro Nagai, Atsugi (JP); Junichiro Onigata, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 108 days.

(21) Appl. No.: 15/545,867

(22) PCT Filed: Jan. 6, 2016

(86) PCT No.: PCT/JP2016/050187
§ 371 (c)(1),
(2) Date: Jul. 24, 2017

(87) PCT Pub. No.: WO2016/121424
PCT Pub. Date: Aug. 4, 2016

(65) Prior Publication Data
US 2018/0016972 A1    Jan. 18, 2018

(30) Foreign Application Priority Data
Jan. 26, 2015  (JP) ................... 2015-012414

(51) Int. Cl.
*F02B 75/04* (2006.01)
*F16H 1/32* (2006.01)
(Continued)

(52) U.S. Cl.
CPC .............. *F02B 75/04* (2013.01); *F01B 31/14* (2013.01); *F02B 75/045* (2013.01); *F02B 75/32* (2013.01);
(Continued)

(58) Field of Classification Search
CPC ...... F02D 15/00; F02D 2700/03; F02B 75/04; F16H 1/32; F16H 49/001; F16H 3/728
See application file for complete search history.

(56) References Cited

U.S. PATENT DOCUMENTS 5,598,813 A * 2/1997 Masuda .............. F02D 13/0284
123/65 PE
2004/0149243 A1  8/2004 Yamada et al.
(Continued)

FOREIGN PATENT DOCUMENTS

JP   2004-183644 A   7/2004
JP   2010-151088 A   7/2010
(Continued)

Primary Examiner — Long T Tran
(74) Attorney, Agent, or Firm — Foley & Lardner LLP

(57) ABSTRACT

Provided is an actuator for a link mechanism for an internal combustion engine, which is capable of improving a degree of freedom in layout while reducing the number of components. The actuator for a link mechanism for an internal combustion engine according to the present invention includes a rolling bearing provided between a wave generator of a wave gear speed reducer and a housing or a motor housing. An inner ring of the rolling bearing is fixed to the wave generator. A restricting portion configured to restrict movement of an outer ring of the rolling bearing to both sides in an axial direction with respect to the housing or the motor housing is provided.

16 Claims, 8 Drawing Sheets

(51) Int. Cl.
*F02D 15/02* (2006.01)
*F01B 31/14* (2006.01)
*F02B 75/32* (2006.01)
*F16H 49/00* (2006.01)

(52) U.S. Cl.
CPC ............... *F02D 15/02* (2013.01); *F16H 1/32* (2013.01); *F16H 49/001* (2013.01); *F16H 2049/003* (2013.01); *Y02T 10/12* (2013.01)

(56) References Cited

U.S. PATENT DOCUMENTS

| | | | |
|---|---|---|---|
| 2015/0204251 A1 | 7/2015 | Tanaka et al. | |
| 2015/0219009 A1* | 8/2015 | Onigata | F02D 15/02 74/586 |
| 2015/0219022 A1* | 8/2015 | Nagai | F02B 75/045 123/48 B |
| 2015/0292400 A1* | 10/2015 | Hiyoshi | F02B 75/045 123/48 R |
| 2017/0254260 A1* | 9/2017 | Yamada | F02B 75/04 |

FOREIGN PATENT DOCUMENTS

| | | |
|---|---|---|
| JP | 2011-169152 A | 9/2011 |
| WO | WO-2014/027497 A1 | 2/2014 |

* cited by examiner

ACTUATOR FOR LINK MECHANISM FOR INTERNAL COMBUSTION ENGINE

TECHNICAL FIELD

The present invention relates to an actuator for, for example, a link mechanism to be used for a variable valve mechanism configured to variably change operating characteristics of an engine valve of an internal combustion engine, or a link mechanism to be used for a variable compression ratio mechanism configured to variably change a mechanical actual compression ratio of the internal combustion engine.

BACKGROUND ART

Hitherto, a technology disclosed in Patent Literature 1 has been known as a variable compression ratio mechanism. According to Patent Literature 1, a multi-link type piston and crank mechanism are used to change stroke characteristics of a piston so that a mechanical compression ratio of an internal combustion engine can be changed. Specifically, the piston and a crankshaft are coupled to each other through intermediation of an upper link and a lower link. A posture of the lower link is controlled by an actuator including a drive motor, a speed reducer, or the like. In this manner, the stroke characteristics of the piston are changed to control the engine compression ratio.

CITATION LIST

Patent Literature

[PTL 1] JP 2011-169152 A

SUMMARY OF INVENTION

Technical Problem

In the technology disclosed in Patent Literature 1, a wave speed reducer is used as the speed reducer. A wave generator constructing the wave speed reducer rotates relative to a second control shaft and a housing, and receives an axial force. Therefore, on both axial sides of the wave generator, there are provided a first sliding member on a side closer to a drive motor and a second sliding member on a side closer to the second control shaft, which receive an axial thrust force while allowing the relative rotation. In a case of arrangement inside, the wave generator as in the case of the second sliding member, however, a radial size of the sliding member is limited. Thus, there is a fear of reduction in thrust load resistance. The present invention has been made in view of the problem described above, and has an object to provide an actuator for a link mechanism for an internal combustion engine, which is capable of ensuring a radial size of a sliding member which receives a thrust force while allowing relative rotation.

Solution to Problem

In order to achieve the object described above, in the actuator for a link mechanism for an internal combustion engine according to one embodiment of the present invention, a rolling bearing is provided between a wave generator of a wave gear speed reducer and a housing or a motor housing, and an inner ring of the rolling bearing is fixed to the wave generator. Further, a restricting portion configured to restrict movement of an outer ring of the rolling bearing to both sides in an axial direction with respect to the housing or the motor housing is provided.

Thus, a diameter of the rolling bearing can be increased, and the thrust force in both axial directions can be received. Therefore, a larger thrust force can be received.

DESCRIPTION OF EMBODIMENTS

Figure 1:
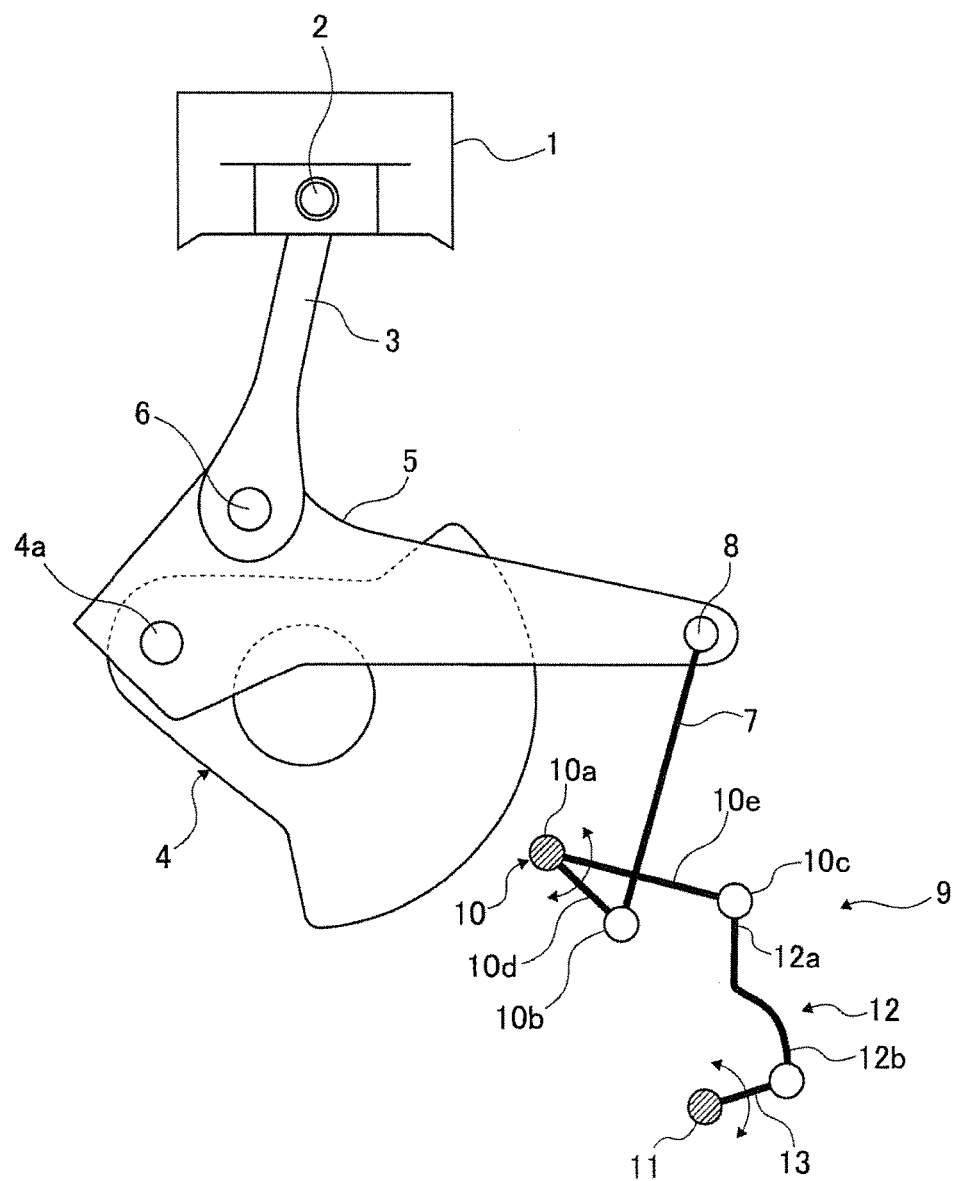
FIG. 1 is a schematic view of an internal combustion engine including an actuator for a link mechanism for an internal combustion engine according to the present invention.

[First Embodiment] FIG. 1 is a schematic view of an internal combustion engine including an actuator for a link mechanism for an internal combustion engine according to one embodiment of the present invention. A basic configuration is the same as that illustrated in FIG. 1 of JP 2011-169152 A, and therefore is briefly described. An upper end of an upper link 3 is rotatably coupled to a piston 1, which moves in a reciprocating manner inside a cylinder of a cylinder block of an internal combustion engine, through intermediation of a piston pin 2. A lower link 5 is rotatably coupled to a lower end of the upper link 3 through intermediation of a coupling pin 6. A crankshaft 4 is rotatably coupled to the lower link 5 through intermediation of a crank pin 4a. Further, an upper end portion of a first control link 7 is rotatably coupled to the lower link 5 through intermediation of a coupling pin 8. A lower end portion of the first control link 7 is coupled to a coupling mechanism 9 including a plurality of link members. The coupling mechanism 9 includes a first control shaft 10, a second control shaft 11, and a second control link 12 configured to couple the first control shaft 10 and the second control shaft 11 to each other.

The control shaft 10 is provided so as to extend in parallel to the crankshaft 4 provided so as to extend in a cylinder bank direction inside the internal combustion engine. The first control shaft 10 includes a first journal portion 10a rotatably supported on an internal combustion engine main body, a control eccentric shaft portion 10b to which the lower end portion of the first control link 7 is rotatably coupled, and an eccentric shaft portion 10c to which one end portion 12a of the second control link 12 is rotatably coupled. A first arm portion 10d has one end coupled to the first journal portion 10a and the other end coupled to the lower end portion of the first control link 7. The control eccentric shaft portion 10b is provided at a position deviated by a predetermined amount with respect to the first journal portion 10a. A second arm portion 10e has one end coupled to the first journal portion 10a and the other end coupled to the one end portion 12a of the second control link 12. The eccentric shaft portion 10c is provided at a position deviated by a predetermined amount with respect to the first journal portion 10a. One end of an arm link 13 is rotatably coupled to the other end portion 12b of the second control link 12. The second control shaft 11 is coupled to the other end of the arm link 13. The arm link 13 and the second control shaft 11 are not moved relative to each other. The second control shaft 11 is rotatably supported in a housing 20 described later through intermediation of a plurality of journal portions.

Figure 6:
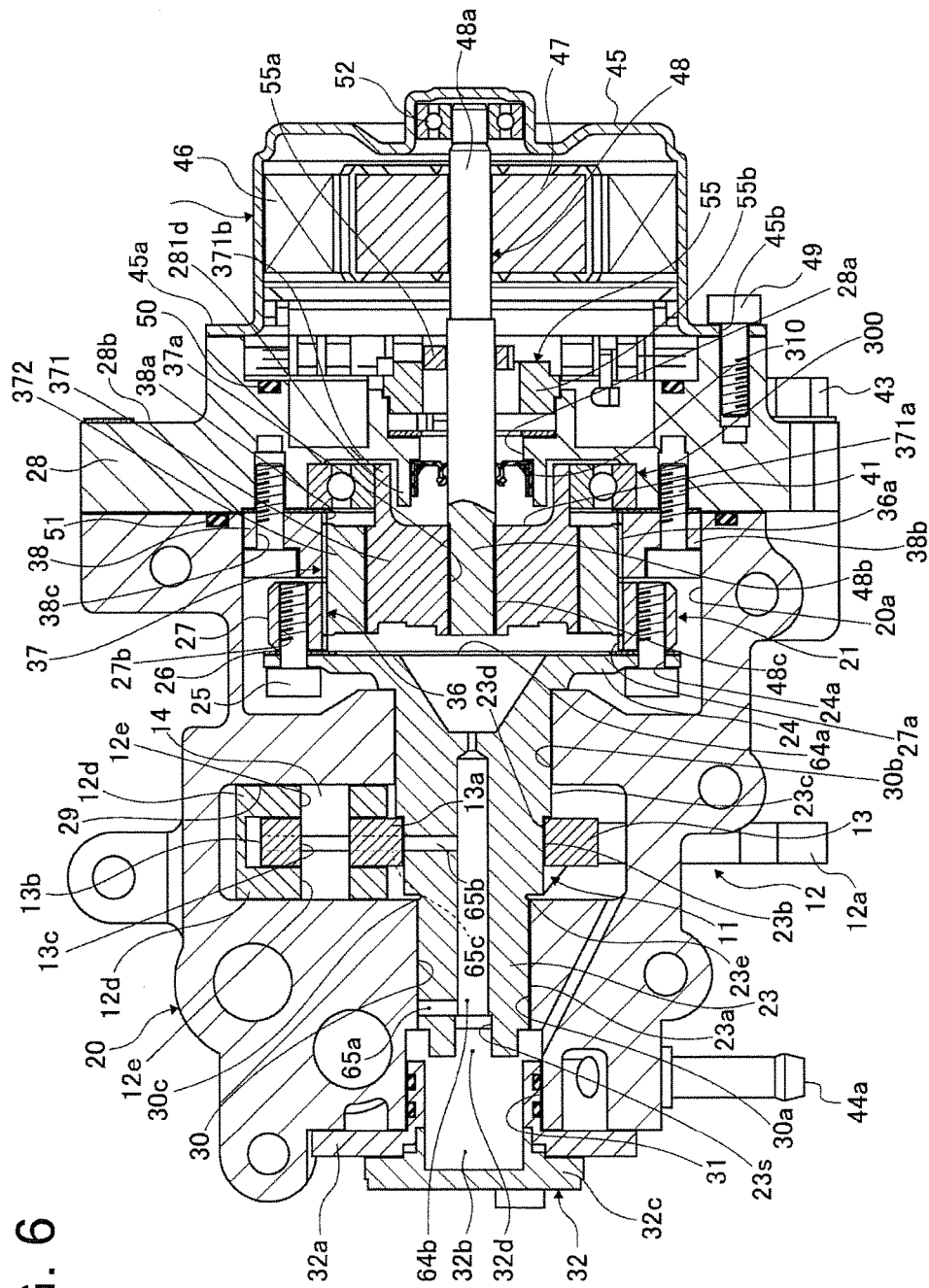
FIG. 6 is a sectional view of the actuator for a link mechanism for an internal combustion engine according to the first embodiment, which is taken along the line A-A.

The second control link 12 has a lever-like shape. The one end portion 12a coupled to the eccentric shaft portion 10c is formed approximately linearly. On the other hand, the other end portion 12b to which the arm link 13 is coupled is formed in a curved fashion. An insertion hole 12c through which the eccentric shaft portion 10c is turnably inserted is formed through a distal end portion of the one end portion 12a. The other end portion 12b has distal end portions 12d formed into a bifurcated shape as illustrated in FIG. 6 being a sectional view taken along the line A-A. A coupling hole 12e is formed through the distal end portion 12d. A coupling hole 13c having a diameter approximately equal to that of the coupling hole 12e is formed through a projecting portion 13b of the arm link 13. The projecting portion 13b of the arm link 13 is sandwiched between the distal end portions 12d formed into the bifurcated shape. In this state, a coupling pin 14 passes through the coupling holes 12e and 13c to be press-fitted and fixed.

Figure 5:
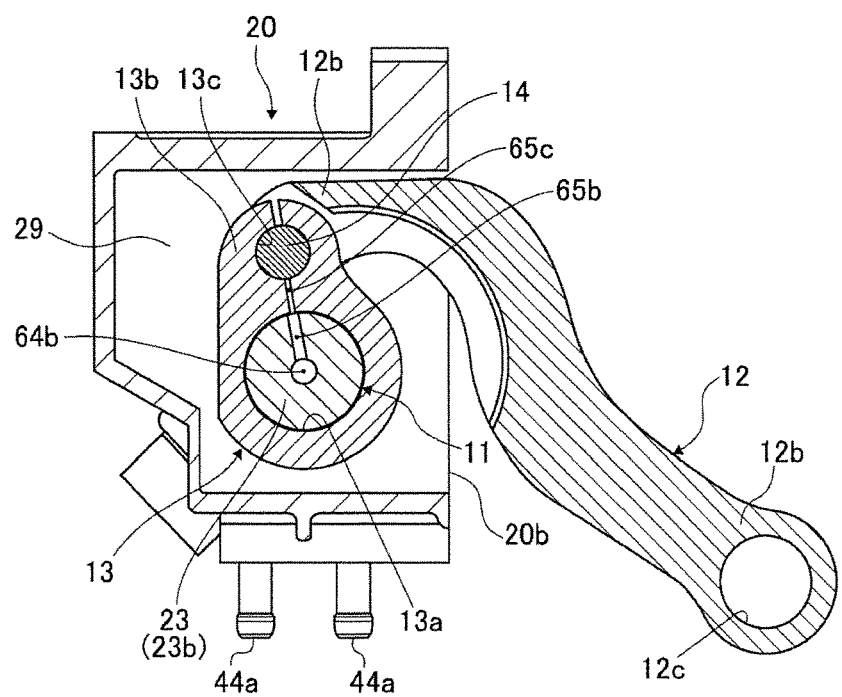
FIG. 5 is a sectional view of a main part of the actuator for a link mechanism for an internal combustion engine according to the first embodiment.

As illustrated in FIG. 5 which is a sectional view of a main part, the arm link 13 is formed separately from the second control shaft 11. The arm link 13 is a member having a large thickness, which is made of an iron-based metal material. The arm link 13 includes an annular portion having a press-fit hole 13a formed in an approximate center to pass therethrough and a projecting portion 13b having a U-shape, which projects to an outer periphery. A fixing portion 23b formed between the journal portions of the second control shaft 11 is press-fitted into the press-fit hole 13a. Through the press-fitting of the fixing portion 23b, the second control shaft 11 and the arm link 13 are fixed. In the projecting portion 13b, there is formed a coupling hole 13c in which the coupling pin 14 is turnably supported. An axial center of the coupling hole 13c (axial center of the coupling pin 14) is deviated from an axial center of the second control shaft 11 by a predetermined amount in a radial direction.

A rotational position of the second control shaft 11 is changed by a torque transmitted from a drive motor 22 through intermediation of a wave gear type speed reducer 21 being a part of the actuator for a link mechanism for an internal combustion engine. When the rotational position of the second control shaft 11 is changed, the first control shaft 10 is rotated through intermediation of the second control link 12 to change a position of the lower end portion of the first control link 7. In this manner, a posture of the lower link 5 is changed to change a stroke position or a stroke amount of the piston 1 inside the cylinder. Along with the change, an engine compression ratio is changed.

Figure 2:
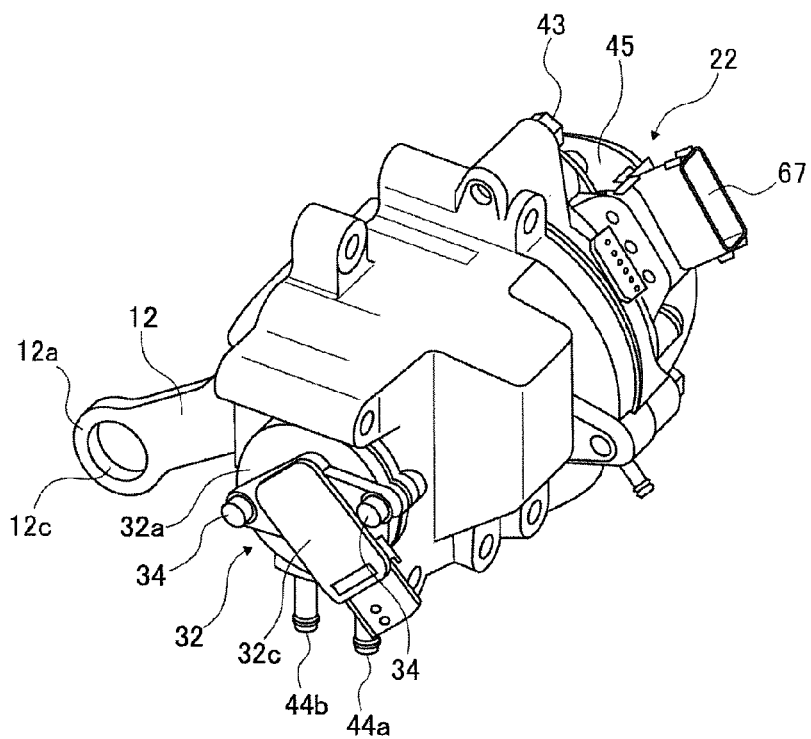
FIG. 2 is a perspective view of an actuator for a link mechanism for an internal combustion engine according to a first embodiment.
Figure 3:
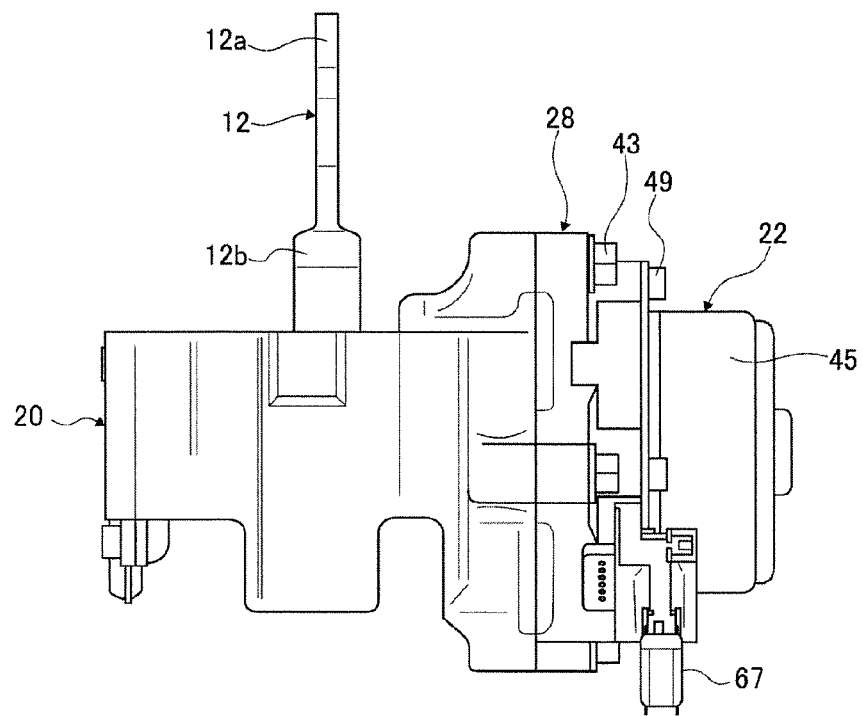
FIG. 3 is a plan view of the actuator for a link mechanism for an internal combustion engine according to the first embodiment.
Figure 4:
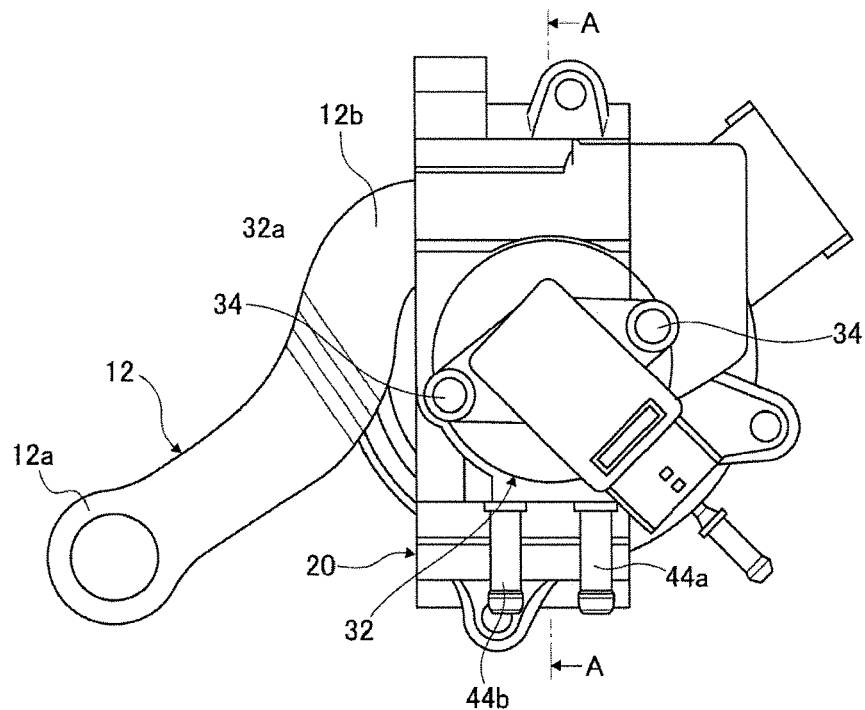
FIG. 4 is a left side view of the actuator for a link mechanism for an internal combustion engine according to the first embodiment.

(Configuration of Actuator for Link Mechanism for Internal Combustion Engine) FIG. 2 is a perspective view of the actuator for a link mechanism for an internal combustion engine according to the first embodiment. FIG. 3 is a plan view of the actuator for a link mechanism for an internal combustion engine according to the first embodiment. FIG. 4 is a left side view of the actuator for a link mechanism for an internal combustion engine according to the first embodiment. FIG. 5 is a sectional view of a main part of the actuator for a link mechanism for an internal combustion engine according to the first embodiment. FIG. 6 is a sectional view of the actuator for a link mechanism for an internal combustion engine according to the first embodiment, which is taken along the line A-A. As illustrated in FIG. 2 to FIG. 6, the actuator for a link mechanism for an internal combustion engine includes the drive motor 22, the wave gear type speed reducer 21 mounted to a distal end side of the drive motor 22, a housing 20 in which the wave gear type speed reducer 21 is accommodated, and the second control shaft 11 rotatably supported in the housing 20.

(Configuration of Drive Motor) The drive motor 22 is a brushless motor, and includes a motor casing 45 having a bottomed cylindrical shape, a coil 46 having a tube-like shape fixed onto an inner peripheral surface of the motor casing 45, a rotor 47 rotatably provided inside the coil 46, a motor drive shaft 48 having one end portion 48a fixed in a center of the rotor 47, and a resolver 55 configured to detect an angle of rotation of the motor drive shaft 48. The motor drive shaft 48 is rotatably supported by a ball bearing 52 provided to a bottom portion of the motor casing 45. The motor casing 45 includes four boss portions 45a formed on an outer periphery of a front end. A bolt insertion hole 45b through which a bolt 49 is inserted is formed through each of the boss portions 45a.

The resolver 55 includes a resolver rotor 55a and a sensor portion 55b. The resolver rotor 55a is press-fitted over and fixed to an outer periphery of the motor drive shaft 48. The sensor portion 55b is configured to detect a plurality of teeth-shaped targets formed on an outer peripheral surface of the resolver rotor 55a. The resolver 55 is provided at a position so as to project through an opening of the motor casing 45. The sensor portion 55b is fixed inside a cover 28 with two screws and outputs a detection signal to a control unit (not shown). When the motor casing 45 is mounted to the cover 28, the bolts 49 are inserted into the boss portions 45a while an O-ring 50 is provided between an end surface of the resolver 55 and the cover 28. Then, the bolts 49 are fastened to male thread portions formed on the cover 28 on a side closer to the drive motor 22. In this manner, the motor casing 45 is fixed to the cover 28. A motor accommodating chamber configured to accommodate the drive motor 22 with the motor casing 45 and the cover 28 is constructed as a dry room into which lubricating oil or the like is not fed.

(Configuration of Second Control Shaft) The second control shaft 11 includes a shaft portion main body 23 provided so as to extend in an axial direction and a fixing flange 24 having a diameter expanded from the shaft portion main body 23. The second control shaft 11 includes the shaft portion main body 23 and the fixing flange 24 formed integrally of an iron-based metal material. The shaft portion main body 23 has a stepped shape in the axial direction, and includes a first journal portion 23a having a small diameter on a distal end portion side, a fixing portion 23b having a medium diameter to be press-fitted into the press-fit hole 13a of the arm link 13 from the first journal portion 23a side, and a second journal portion 23c having a large diameter on the fixing flange 24 side. A first stepped portion 23d is formed between the fixing portion 23b and the second journal portion 23c. A second stepped portion 23e is formed between the first journal portion 23a and the fixing portion 23b.

When the press-fit hole 13a of the arm link 13 is press-fitted over the fixing portion 23b from the first journal portion 23a side, one end portion of the press-fit hole 13a on a side closer to the second journal portion 23c is brought into abutment against the first stepped portion 23d in the axial direction to restrict movement of the arm link 13 toward the second journal portion 23c. Meanwhile, when the shaft portion main body 23 is inserted through a support hole 30 formed in the housing 20, the second stepped portion 23e is brought into abutment against a stepped hole edge portion 30c of the support hole 30 to restrict movement of the second control shaft 11 in the axial direction toward a side opposite to the wave gear type speed reducer 21. Six bolt insertion holes 24a are formed equiangularly in an outer peripheral portion of the fixing flange 24. Six bolts 25 are inserted into the bolt insertion holes 24a so that the fixing flange 24 is joined to circular spline 27 corresponding to internal teeth of the wave gear type speed reducer 21 through a thrust plate 26.

In the second control shaft 11, there is provided an introduction portion configured to introduce lubricating oil pressure-fed from an oil pump (not shown). The introduction portion is formed in a center of the fixing flange 24, and includes an oil chamber 64a and an axial oil passage 64b. The oil chamber 64a has a conical shape. The lubricating oil is fed through an oil hole (not shown) to the oil chamber 64a. The axial oil passage 64b is formed from the oil chamber 64a along an axial center direction of the second control shaft. In the second control shaft 11, there are formed a plurality of radial oil passages 65a and 65b being in communication with the axial oil passage 64b. A radially outer side of the radial oil passage 65a is open toward a clearance between an outer peripheral surface of the first journal portion 23a and the first bearing hole 30a, and the radial oil passage 65a feeds the lubricating oil to the first journal portion 23a. The radial oil passage 65b is in communication with an oil hole 65c formed inside the arm link 13 and feeds the lubricating oil between an inner peripheral surface of the coupling hole 13c and an outer peripheral surface of the coupling pin 14 through the oil hole 65c.

(Configuration of Housing) The housing 20 is formed of an aluminum alloy material to have an approximately cubic shape. An opening groove portion 20a having a large-diameter annular shape is formed on a rear end side of the housing 20. The opening groove portion 20a is closed with the cover 28 through an O-ring 51 therebetween. The cover 28 has a motor-shaft through hole 28a formed in a center position, through which the motor-shaft through hole 28 passes, and four boss portions 28b radially expanded to a radially outer peripheral side. The cover 28 and the housing 20 are fastened and fixed by inserting bolts 43 through bolt through holes formed through the boss portions 28b.

On a side surface perpendicular to an opening direction of the opening groove portion 20a, there is formed one side surface 20b being an opening for the second control link 12 coupled to the arm link 13 (see FIG. 5). On an inner side of the first side surface 20b inside the housing 20, there is formed an accommodation chamber 29 serving as a working region for the arm link 13 and the second control link 12. Between the opening groove portion 20a and the accommodation chamber 29, there is formed a speed-reducer side through hole 30b through which the second journal portion 23c of the second control shaft 11 passes. A support hole 30 through which the first journal portion 23a of the second control shaft 11 passes is formed in an axial side surface of the accommodation chamber 29. Further, in a retention hole 31 extended from the support hole 30 in the axial direction, an angle sensor 32 configured to detect an angle of rotation of the second control shaft 11 is accommodated. Further, a feed pipe 44a and a drain pipe 44b for cooling water for cooling the angle sensor 32 are connected to the housing 20 (see FIG. 5).

(Configuration of Angle Sensor) The angle sensor 32 includes a sensor cover 32a, a rotor 32b, and a sensor portion 32c. The sensor cover 32a has a cap-like shape and is press-fitted into and fixed to an inner peripheral surface of the retention hole 31. The rotor 32b is arranged on an inner peripheral side of the sensor cover 32a and is configured to rotate integrally with the second control shaft 11. The sensor portion 32c is provided in a center of the sensor cover 32a and is configured to detect a position of rotation of the rotor 32b. A distal end projecting portion 32d of the rotor 32b is press-fitted into and fixed to a rotor fixing hole 23s formed on a distal end side of the shaft portion main body 23 of the second control shaft 11. The sensor portion 32c outputs a detected rotor position signal to a control unit (not shown) configured to detect an engine operating state.

(Configuration of Wave Gear Type Speed Reducer) The wave gear type speed reducer 21 is of harmonic drive (registered trademark) type and includes components accommodated in the opening groove portion 20a of the housing 20 closed with the cover 28. The wave gear type speed reducer 21 includes the first circular spline 27, a flex spline 36, a wave generator 37, and a second circular spline 38. The first circular spline 27 has an annular shape and is fixed to the fixing flange 24 of the second control shaft 11 with the bolts, and a plurality of internal teeth 27a are formed on an inner periphery thereof. The flex spline 36 is arranged on a radially inner side of the first circular spline 27. The flex spline 36 is flexurally deformable and has external teeth 36a formed on an outer peripheral surface to mesh with the internal teeth 27a. The wave generator 37 is a wave generating device formed into an ellipsoidal shape, and has an outer peripheral surface slidable along an inner peripheral surface of the flex spline 36. The second circular spline 38 is arranged on a radially outer side of the flex spline 36, and has internal teeth 38a formed on an inner peripheral surface to mesh with the external teeth 36a.

On an outer peripheral side of the first circular spline 27, there are formed male thread holes 27b being nut portions respectively for the bolts 25 at equiangular positions. The flex spline 36 is made of a metal material, and is a flexurally deformable cylindrical member having a small thickness. The number of the external teeth 36a of the flex spline 36 is the same as the number of the internal teeth 27a of the first circular spline 27.

Figure 10:
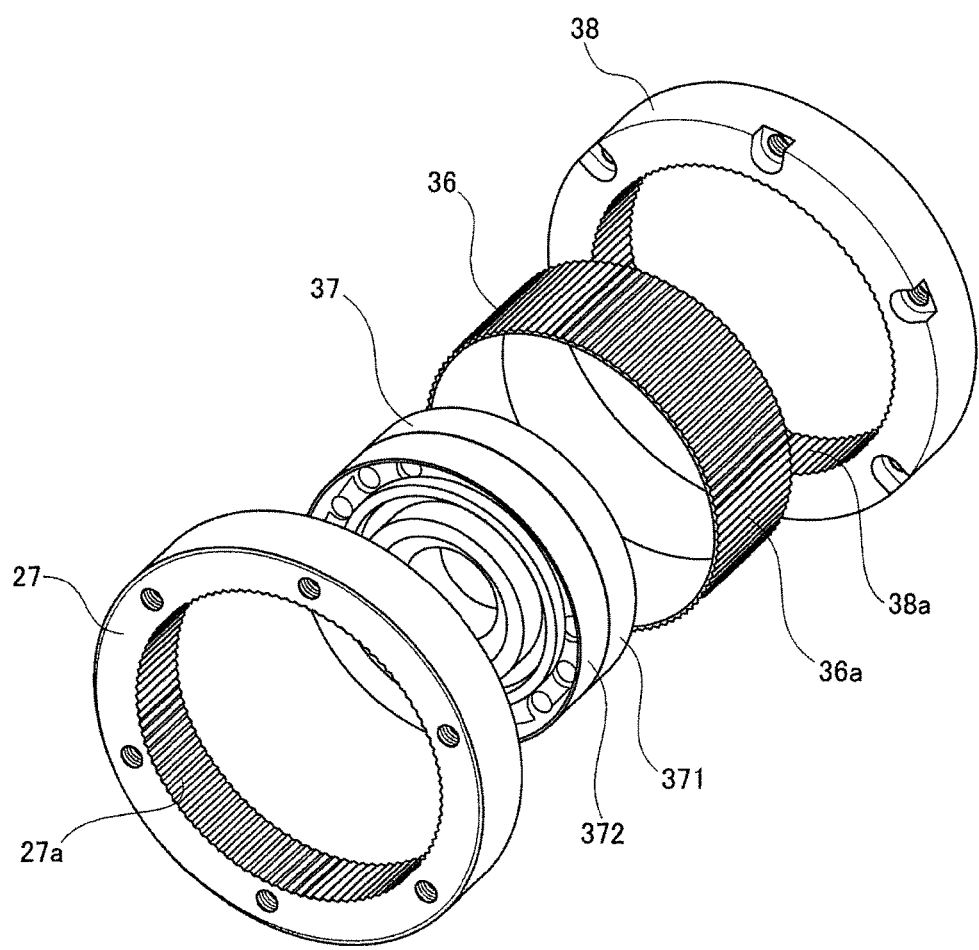
FIG. 10 is an exploded perspective view for illustrating a wave gear type speed reducer of the first embodiment.

The wave generator 37 includes a main body portion 371 having an ellipsoidal shape and ball bearings 372 configured to allow relative rotation between an outer periphery of the main body portion 371 and an inner periphery of the flex spline 36. The ball bearings 372 are arranged in two rows side by side in the axial direction so as to be able to deal with a high torque. In a center of the main body portion 371, a through hole 37a is formed. An outer periphery of the other end portion 48b of the motor drive shaft 48 is press-fitted into the through hole 37a so as to be joined thereto. The joint may be a joint through a key groove or spline coupling, and is not particularly limited. A cylindrical portion 371*b* extended toward the drive motor so as to surround an outer periphery of the through hole 37*a* is formed on a drive-motor side side surface 371*a* of the main body portion 371. A sectional shape of the cylindrical portion 371*b* is a perfect circle. A diameter of an outer periphery of the cylindrical portion 371*b* is set smaller than a short diameter of the main body portion 371 (see FIG. 7 and FIG. 10).

A flange 38*b* to be fastened to the cover 28 is formed on an outer periphery of the second circular spline 38. Six bolt through holes 38*c* are formed through the flange 38*b*. A second thrust plate 42 is provided between the second circular spline 38 and the cover 28. Then, bolts 41 are inserted into the bolt through holes 38*c* to fasten and fix the second circular spline 38 and the second thrust plate 42 to the cover 28. The second thrust plate 42 is formed of an iron-based metal material having a wear resistance equal to or higher than that of the flex spline 36. In this manner, the cover 28 is prevented from being worn by a thrust force generated in the flex spline 36, and an axial position of a ball bearing 300 described later is restricted. Details are described later. The number of the internal teeth 38*a* of the second circular spline 38 is larger than the number of the external teeth 36*a* of the flex spline 36 by two. Thus, the number of the internal teeth 38*a* of the second circular spline 38 is larger than the number of the internal teeth 27*a* of the first circular spline 27 by two. In a wave gear type speed reducing mechanism, a speed reduction ratio is determined based on a difference between the numbers of teeth. Thus, an extremely large speed reduction ratio is obtained.

Figure 7:
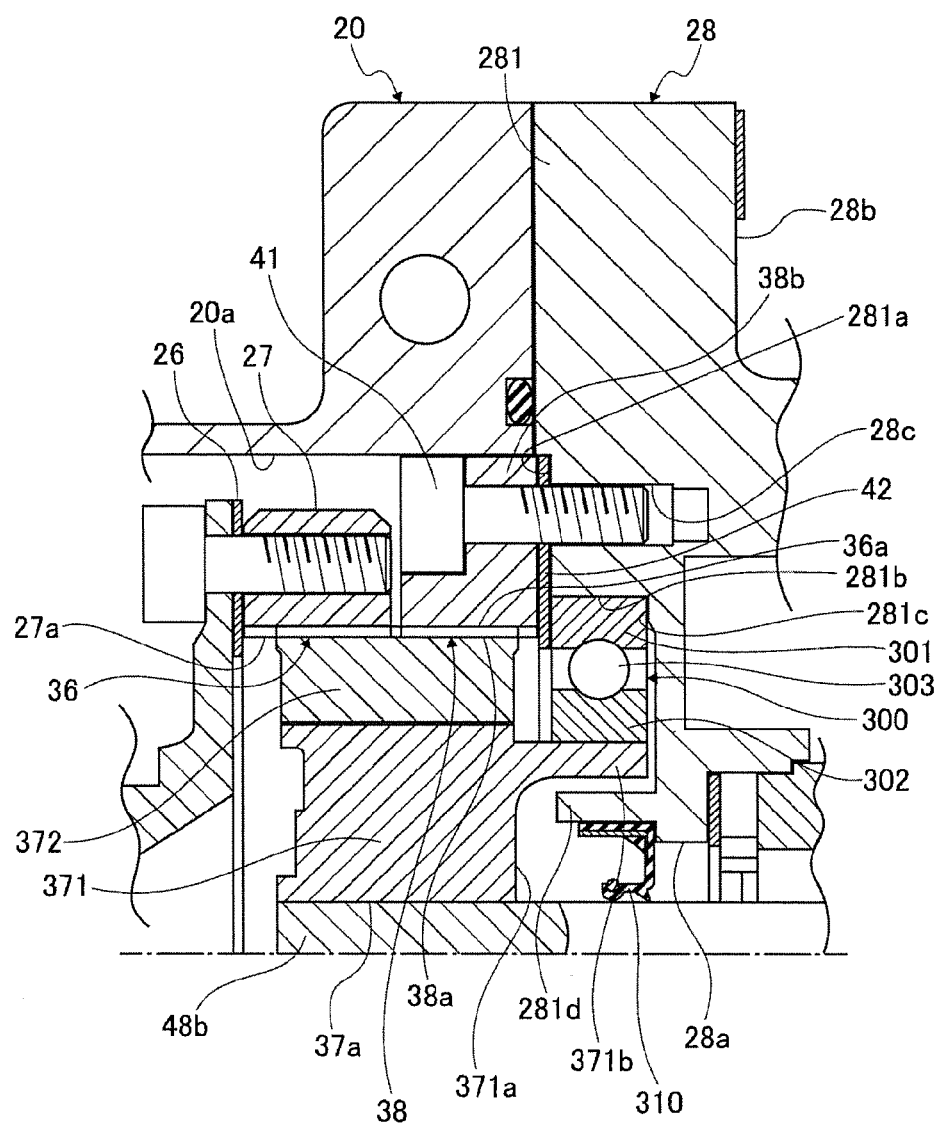
FIG. 7 is an enlarged sectional view of a joined portion between a housing and a cover of the actuator for a link mechanism for an internal combustion engine according to the first embodiment.

(Support Structure for Rotary Member) FIG. 7 is an enlarged sectional view of a joined portion between a housing and a cover of the actuator for a link mechanism for an internal combustion engine according to the first embodiment. On an end surface 281 of the cover 28 on a side closer to the wave gear type speed reducer 21, there are formed a female thread portion 28*c*, a plate accommodating portion 281*a*, a bearing accommodating portion 281*b*, and a seal accommodating portion 281*d*. The bolt 41 is threadably engaged with the female thread portion 28*c*. The plate accommodating portion 281*a* has a depth approximately equal to a thickness of the second thrust plate 42 and is configured to accommodate the second thrust plate 42 therein. The bearing accommodating portion 281*b* is a stepped portion having a bottomed cylindrical shape and is formed to be bent from the plate accommodating portion 281*a* toward the drive motor 22. The seal accommodating portion 281*d* has a cylindrical shape and is provided at a radially inner position of a bottom surface 281*c* of the bearing accommodating portion 281*b* so as to extend in the axial direction toward the wave generator side. The above-mentioned motor shaft through hole 28*a* is formed further on the radially inner side of the seal accommodating portion 281*d*.

In the bearing accommodating portion 281*b*, the open-type ball bearing 300 is accommodated. The ball bearing 300 is a deep groove ball bearing which can receive a load in a thrust direction. The ball bearing 300 includes an outer ring 301, an inner ring 302, and balls 303 arranged between the outer ring 301 and the inner ring 302. An axial thickness of the ball bearing 300 is approximately equal to an axial depth of the bearing accommodating portion 281*b*. Further, an outer diameter of the ball bearing 300 is set larger than an outer diameter of a ball bearing 52 so as to sufficiently ensure a bearing capacity. The outer ring 301 is accommodated in the bearing accommodating portion 281*b*. An end surface of the outer ring 301 on a side closer to the wave gear type speed reducer 21 is in abutment against the second thrust plate 42, whereas an end surface of the outer ring 301 on a side closer to the drive motor 22 is in abutment against the bottom surface 281*c*. In this manner, the second thrust plate 42 and the bottom surface 281*c* construct a restricting portion configured to restrict a position of the outer ring 301 in both of a direction toward the wave gear type speed reducer 21 and a direction toward the drive motor 22 in an axial direction of the ball bearing 300. Further, the bearing accommodating portion 281*b* is provided at the wave generator 37, which is closer to the drive motor 22. Specifically, the ball bearing 300 is supported at a position closer to the drive motor 22, thereby suppressing deformation of the motor drive shaft 48 so as to suppress an increase in axial size toward the second control shaft 11. The ball bearing 300 only needs to receive the load in the thrust direction, and may be, for example, a four-point contact bearing or an angular bearing.

An outer diameter of the outer ring 301 is set larger than an inner diameter of the first circular spline 27 and an inner diameter of the second circular spline 38. Thus, an allowable load amount of the ball bearing 300 in the axial direction and the radial direction can be ensured. Further, an inner diameter of the outer ring 301 is set smaller than an inner diameter of the flex spline 36. Thus, a region over which the second thrust plate 42 provided between the outer ring 301 and the wave gear type speed reducer 21 covers an end surface of the outer ring 301 on a side closer to the wave gear type speed reducer 21 can be enlarged. As a result, durability of the second thrust plate 42 can be improved.

An inner periphery of the inner ring 302 is fixed (press-fitted) over an outer peripheral side of the cylindrical portion 371*b* provided so as to extend from the main body portion 371 of the wave generator 37. The fixation herein is not limited to the press-fit, and may also include, for example, fixation through restriction of an axial position with a step and a snap ring. In this manner, the motor drive shaft 48 is supported by the ball bearing 52 provided between the motor drive shaft 48 and the motor casing 45, and is also supported by the ball bearing 300 through intermediation of the main body portion 371 and the cylindrical portion 371*b*. Thus, the motor drive shaft 48 can be supported on both ends. As a result, operation stability of the drive motor 22 can be ensured. When the main body portion 371 and the motor drive shaft 48 are supported by bearings independently of each other, center positions of the bearings are required to be aligned with each other with high accuracy. Thus, manufacture cost is a concern. In particular, when each of the bearings is provided over a plurality of divided members, positional accuracy particularly becomes a problem. On the other hand, the wave gear type speed reducer 21 is supported only on the cover 28 side. Thus, ease of assembly becomes more favorable, and ease of manufacture can be improved.

Now, description is made of effects of the above-mentioned configuration based on functions of the wave gear type speed reducer 21 during an operation. When a rotational driving force is input from the drive motor 22, the main body portion 371 of the wave generator 37 is rotated. At this time, the flux spline 36 partially meshes with the second circular spline 38 while being flexurally deformed, thereby outputting the rotation at a reduced speed to the first circular spline 27 and the second control shaft 11. When the flexural deformation occurs in the flex spline 36 in this manner, a component force of a transmission torque is generated in the axial direction even when the internal teeth 27*a* and 38*a* and the external teeth 36*a* are flat teeth. Thus, a thrust force is generated in the wave generator 37. Further, torsion occurs in the flex spline 36 at the time of torque transmission. Even due to the torsion, the thrust force is generated in the wave generator 37. On the other hand, when a rotational torque is input from the second control shaft 11 based on a torque from the internal combustion engine, the flexural deformation or torsional deformation also occurs in the flex spline 36. In the wave generator 37, a thrust force in a direction opposite to the thrust force generated when the torque is input from the motor drive shaft 48 side is generated. When the thrust force is received, for example, only between an end surface of the flex spline 36 and the thrust plate 26 or between the flex spline 36 and the second thrust plate 42, there is a fear in that degradation of durability of the flex spline 36 or degradation of durability of the thrust plate 26 and the second thrust plate 42 may be brought about.

Further, the generated thrust force has a proportional relationship with a magnitude of the input torque. For example, it is considered that support bearings are arranged at both ends of the wave generator 37 so that the thrust forces exerted in the respective directions are received by the support bearings at the both ends to achieve the improvement of the durability of each of the thrust plates and the flex spline 36 describe above. When a load torque transmitted from a main motor system of the internal combustion engine increases, however, reliability of the support bearings is required to be improved. Then, a bearing capacity is required to be ensured by increasing a size of each of the support bearings. In view of the need of ensuring a space in the axial direction, the whole apparatus is increased in size. Further, cost is increased along with increase in capacities of the plurality of bearings.

Therefore, in the first embodiment, the ball bearing 300 configured to directly support the main body portion 371 is arranged. Further, the ball bearing 300 is arranged on the cover 28 side, and the axial position thereof is restricted by the cover 28 and the second thrust plate 42. As a result, as compared to a case where the bearings or the like are arranged on both sides of the wave generator 37, the axial direction can be reduced while the number of components is reduced. Further, the axial position of the motor drive shaft 48 and the axial position of the main body portion 371 are restricted through intermediation of the ball bearing 300. As a result, even when the thrust force is exerted on the wave generator 37, stable retention can be achieved. Further, the thrust force is received by the ball bearing 300, and therefore a force exerted from the flex spline 36 onto the second thrust plate 42 can be suppressed. As a result, the degradation of the durability of the flex spline 36 and the second thrust plate 42 can be prevented.

(Configuration of Sealing Portion) On a radially inner side of the cylindrical portion 371b, there is formed the seal accommodating portion 281d having a diameter smaller than that of an inner peripheral surface of the cylindrical portion 371b. A seal member 310 configured to seal between the opening groove portion 20a configured to accommodate the wave gear type speed reducer 21 therein and the drive motor 22 in a liquid tight fashion is provided between an inner periphery of the seal accommodating portion 281d and the outer periphery of the motor drive shaft 48. The seal accommodating portion 281d is provided so as to extend on the radially inner side of the cylindrical portion 371b. In other words, the seal accommodating portion 281d is formed so as to overlap the cylindrical portion 371b and the ball bearing 300 as viewed from the radial direction. Thus, the increase in the axial size can be suppressed.

Further, the seal member 310 achieves division into the dry chamber being the motor accommodating chamber configured to accommodate the drive motor 22 therein and a lubricating chamber being a speed reducer accommodating chamber configured to accommodate the second control shaft 11 and the wave gear type speed reducer 21 therein. The single ball bearing 52 is provided on the dry chamber side, whereas the ball bearing 300 is provided on the lubricating chamber side. Therefore, the ball bearing 300 on the lubricating chamber side can be lubricated externally. Thus, an open-type ball bearing can be used as the ball bearing 300. As a result, a cost reduction can be achieved. Durability of the ball bearing 52 on the dry chamber side only needs to be ensured by using, for example, a lubricating-oil enclosed bearing or the like without including a special lubricating mechanism.

[Effects of First Embodiment]

Effects produced by the actuator for a link mechanism for an internal combustion engine described in the first embodiment are now listed below.

(1-1) The actuator for a link mechanism for an internal combustion engine includes the second control link 12 (control link) having the one end portion coupled to the link mechanism for the internal combustion engine, the second control shaft 11 (control shaft) configured to change the posture of the second control link 12 through rotation, the housing 20 configured to rotatably support the second control shaft 11, and the wave gear type speed reducer 21 configured to transmit a rotation speed of the motor drive shaft 48 being an output shaft of the drive motor 22 to the second control shaft 11 after reducing the rotation speed. The wave gear type speed reducer 21 includes the second circular spline 38 (circular spline), which is provided in the housing and has the internal teeth, the flex spline 36, which is arranged on the inner side of the second circular spline 38 and has the external teeth 36a on the outer periphery, the wave generator 37, which is configured to be rotated by the motor drive shaft 48 to warp the flex spline 36 into the ellipsoidal shape so as to partially mesh the external teeth 36a of the flex spline 36 with the internal teeth 38a of the second circular spline 38 and is configured to rotate a meshed portion between the flex spline 36 and the circular spline 38, and the ball bearing 52 and the ball bearing 300 (rolling bearing), which are provided between the wave generator 37 and the housing 20 or the motor casing 45 (motor housing). The actuator includes the restricting portion (the second thrust plate 42, which is configured to restrict the movement toward the wave generator 37, and the bottom surface 281c of the bearing accommodating portion 281b, which is configured to restrict the movement toward the side opposite to the wave generator 37 with respect to the housing 20 or the motor casing 45 (motor housing)) configured to restrict the movement of the outer ring 301 of the ball bearing 300 to the both sides in the axial direction with respect to the housing 20 or the motor casing 45 (motor housing).

Thus, a diameter of the ball bearing 300 can be increased, while the thrust forces in the both axial directions can be received. Thus, the axial direction can be reduced, while the number of components is reduced.

(1-2) In the actuator for a link mechanism for an internal combustion engine described above in the item (1-1), the link mechanism for the internal combustion engine is a variable compression ratio mechanism capable of changing an engine compression ratio by changing at least one of a top dead center position or a bottom dead center position of the piston of the internal combustion engine through actuation of the second control link 12.

Thus, improvement of fuel efficiency can be achieved by changing the compression ratio. In the variable compression ratio mechanism, a force for receiving a reaction force from each of the pistons by the link mechanism becomes extremely large. At this time, effective suppression for the thrust force allows achievement of stable compression ratio change control.

(1-3) In the actuator for a link mechanism for an internal combustion engine described above in the item (1-2), the wave generator 37 includes the cylindrical portion 371*b* provided so as to extend in the axial direction toward the drive motor 22, and the ball bearing 300 is provided between the cylindrical portion 371*b* and the housing 20.

Thus, the ball bearing 300 can be provided at a position closer to the drive motor 22 so that the deformation of the motor drive shaft 48 can be suppressed. Further, the increase in the axial size toward the second control shaft 11 can be suppressed.

(1-4) In the actuator for a link mechanism for an internal combustion engine described above in the item (1-3), the inner ring 302 is press-fitted and fixed over the outer periphery of the cylindrical portion 371*b*.

Thus, the wave gear type speed reducer 21 and the ball bearing 300 can be formed into a module, and therefore can be easily assembled to the cover 28.

(1-5) In the actuator for a link mechanism for an internal combustion engine described above in the item (1-4), the one axial end of the outer ring 301 of the ball bearing 300 is brought into abutment against the bottom surface 281*c* (stepped portion) of the bearing accommodating portion 281*b* formed on the housing 20 in the axial direction so as to restrict the movement of the outer ring 301 toward the one axial end, and the other axial end thereof is brought into abutment against the second thrust plate 42 (plate) fixed to the housing 20 in the axial direction so as to restrict the movement of the outer ring 301 toward the other axial end.

Thus, even when the thrust forces in the both directions are exerted on the ball bearing 300, the axial position of the wave generator 37 and the axial position of the motor drive shaft 48 can be restricted. Thus, a stable operating state can be achieved.

(1-6) In the actuator for a link mechanism for an internal combustion engine described above in the item (1-5), the second thrust plate 42 is provided between the second circular spline 38 and the ball bearing 300.

Thus, even when the thrust force is exerted from the flex spline 36 onto the second thrust plate 42, the second thrust plate 42 can be supported by the ball bearing 300. Thus, the stable operating state can be achieved.

(1-7) In the actuator for a link mechanism for an internal combustion engine described above in the item (1-6), the second thrust plate 42 is fixed to the housing 20 with the bolts 41.

Thus, with fastening torques of the bolts 41, a restricting force for the second thrust pate 42 can be easily ensured.

(1-8) In the actuator for a link mechanism for an internal combustion engine described above in the item (1-2), the ball bearing 300 is provided on the side of the wave generator 37, which is closer to the drive motor 22 in the axial direction.

Thus, a space between the wave generator 37 and the second control shaft 11 is not required to be enlarged. Thus, the increase in the axial size can be suppressed.

(1-10) In the actuator for a link mechanism for an internal combustion engine described above in the item (1-3), the ball bearing 300 has an outer diameter larger than an inner diameter of the second circular spline 38.

Thus, the bearing capacity of the ball bearing 300 can be ensured.

Figure 8:
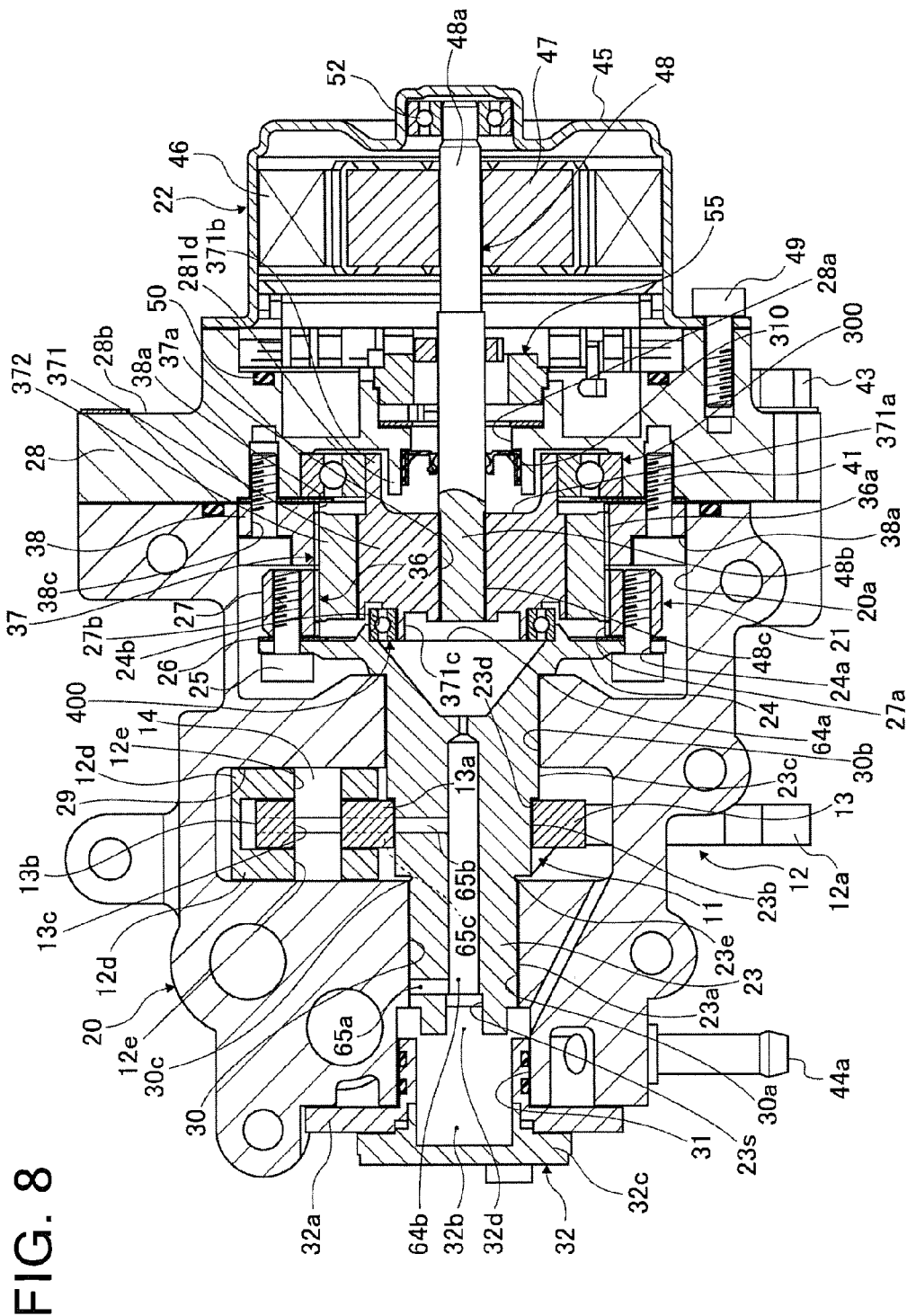
FIG. 8 is a sectional view of an actuator for a link mechanism for an internal combustion engine according to a second embodiment, which is taken along the line A-A.

[Second Embodiment] Next, a second embodiment is described. A basic configuration is the same as that of the first embodiment, and therefore only differences are described. FIG. 8 is a sectional view of an actuator for a link mechanism for an internal combustion engine according to the second embodiment, which is taken along the line A-A. In the first embodiment, the motor drive shaft 48 and the main body portion 371 of the wave generator 37 are pivotably supported by the two bearings corresponding to the ball bearing 52 and the ball bearing 300. On the other hand, the second embodiment is different in that a ball bearing 400 is further provided on the side of the wave generator 37, which is closer to the second control shaft 11. Specifically, a tubular portion 371*c* provided so as to extend from an end surface of the main body portion 371 is provided. A stepped portion 24*b* having an annular shape is formed on an end surface of the fixing flange 24 of the second control shaft 11. The ball bearing 400 is retained by the tubular portion 371*c* and the stepped portion 24*b*. In this manner, the motor drive shaft 48 and the wave generator 37 can be more stably retained. Further, when the thrust force toward the second control shaft 11 is generated in the wave generator 37, the thrust force is received by the ball bearing 400. In this manner, a burden on the ball bearing 300 and the second thrust plate 42 is reduced so that improvement of durability can be achieved. Further, the ball bearing 400 is additionally provided in the lubricating chamber being the speed reducer accommodating chamber. Thus, the open-type ball bearing can be used. Thus, the rise in cost can be suppressed.

Figure 9:
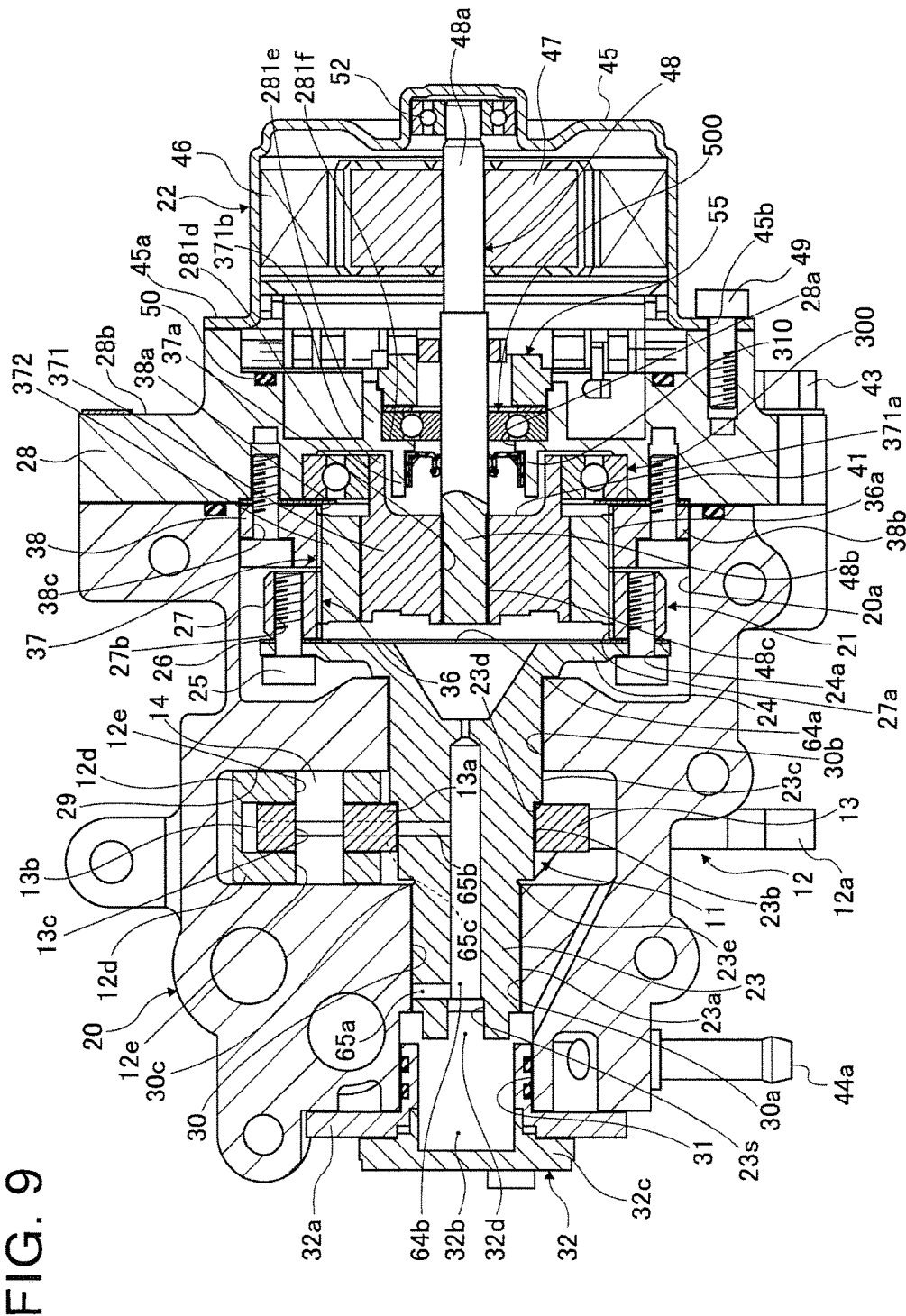
FIG. 9 is a sectional view of an actuator for a link mechanism for an internal combustion engine according to a third embodiment, which is taken along the line A-A.

[Third Embodiment] Next, a third embodiment is described. A basic configuration is the same as that of the first embodiment, and therefore only differences are described. FIG. 9 is a sectional view of an actuator for a link mechanism for an internal combustion engine according to the third embodiment, which is taken along the line A-A. In the first embodiment, the motor drive shaft 48 and the main body portion 371 of the wave generator 37 are pivotably supported by the two bearings corresponding to the ball bearing 52 and the ball bearing 300. On the other hand, in the third embodiment, a bearing accommodating portion 281*e* having a cylindrical shape provided so as to extend from the bottom surface 281*c* of the bearing accommodating portion 281*b* toward the motor accommodating chamber on the drive motor 22 side, and a ball bearing 500 arranged between a bearing accommodating portion 281*e* and the motor drive shaft 48 are provided. In this manner, the motor drive shaft 48 are pivotally supported at two positions inside the motor accommodating chamber, thereby being capable of more stably retaining the motor drive shaft 48 and the wave generator 37. Further, a bottom surface 281f of the bearing accommodating portion 281*e* and an end surface of the ball bearing 500 are brought into abutment against each other, thereby being capable of restricting movement in the axial direction toward the wave gear type speed reducer 21 along with the thrust force. As a result, the burden on the ball bearing 300 and the second thrust plate 42 is reduced so that the improvement of the durability can be achieved.

Technical ideas obtained from the embodiments described above are listed below.

(11) The actuator for a link mechanism for an internal combustion engine includes the control link having the one end portion coupled to the link mechanism for the internal combustion engine, the control shaft configured to change the posture of the control link through the rotation, the housing configured to rotatably support the control shaft, the drive motor configured to rotationally drive the motor output shaft, and the wave gear type speed reducer configured to transmit the rotation speed of the motor output shaft to the control shaft after reducing the rotation speed. The wave gear type speed reducer includes the first circular spline having the internal teeth which is configured to rotate integrally with the control shaft, the second circular spline which is fixed to the housing and has more internal teeth than the first circular spline, the flex spline which is arranged on the inner side of the first circular spline and the second circular spline, is configured to be elastically deformed, and has external teeth formed on the outer periphery, which are provided as many as the number of the internal teeth of the first circular spline, the wave generator which is configured to be rotated by the output shaft of the drive motor to warp the flex spline in the ellipsoidal shape so as to partially mesh the external teeth of the flex spline with the internal teeth of the first circular spline and the internal teeth of the second circular spline and is configured to rotate the meshed portion between the flex spline and the second circular spline, and the rolling bearing provided between the wave generator and the housing. The rolling bearing is configured to receive the loads in the both axial directions on the wave generator.

Thus, the thrust forces in the both directions can be received by the rolling bearing. Thus, the axial direction can be reduced, while the number of components is reduced.

(12) In the actuator for a link mechanism for an internal combustion engine described above in the item (11), the inner ring of the rolling bearing is fixed to the cylindrical portion of the wave generator, which is extended in the axial direction.

Thus, the axial direction can be reduced.

(13) In the actuator for a link mechanism for an internal combustion engine described above in the item (12), the inner ring is press-fitted and fixed over the outer periphery of the cylindrical portion.

Thus, the wave gear type speed reducer and the rolling bearing can be formed into a module, and therefore can be easily assembled to the drive motor.

(14) In the actuator for a link mechanism for an internal combustion engine described above in the item (12), the one axial end of the outer ring of the rolling bearing is brought into abutment in the axial direction against the stepped portion formed on the housing so as to restrict movement of the outer ring toward the one axial end, and an opposite axial end thereof is brought into abutment in the axial direction against the plate fixed to the housing so as to restrict movement of the outer ring toward the opposite axial end. Thus, even when the thrust forces in the both directions are exerted on the rolling bearing, the axial position of the wave generator and the axial position of the motor output shaft can be restricted. As a result, a stable operating state can be achieved.

(15) In the actuator for a link mechanism for an internal combustion engine described above in the item (14), the plate is provided between the circular spline and the rolling bearing.

Thus, even when the thrust forces are exerted from the flex spline on the plate, the plate can be supported by the rolling bearing. As a result, the stable operating state can be achieved.

(16) In the actuator for a link mechanism for an internal combustion engine described above in the item (14), the plate is fixed to the housing with the bolt.

Thus, with the fastening torques of the bolt, the restricting force for the plate can be easily ensured.

(17) In the actuator for a link mechanism for an internal combustion engine described above in the item (11), the link mechanism for the internal combustion engine is the variable compression ratio mechanism capable of changing the engine compression ratio by changing at least one of the top dead center position or the bottom dead center position of the piston of the internal combustion engine through actuation of the control link.

Thus, the improvement of the fuel efficiency can be achieved by changing the compression ratio. In the variable compression ratio mechanism, the force for receiving the reaction force from each of the pistons by the link mechanism becomes extremely large. At this time, effective suppression for the thrust force allows the achievement of the stable compression ratio change control.

(18) The actuator for a link mechanism for an internal combustion engine includes the second control link 12 (control link) having the one end portion coupled to the link mechanism for the internal combustion engine, the arm link 13 rotatably coupled to the opposite end portion of the second control link 12, the second control shaft 11 (control shaft) to which the arm link 13 is fixed, the drive motor 22 configured to rotationally drive the motor drive shaft 48 and the wave generator 37 (output shaft) inserted through the motor casing 45, the wave gear type speed reducer 21 (speed reducer) configured to transmit the rotation speed of the motor drive shaft 48 to the second control shaft 11 after reducing the rotation speed, the housing 20 which is configured to rotatably support the second control shaft 11 and includes the speed reducer accommodating chamber configured to accommodate the wave gear type speed reducer 21 therein, the axial oil passages 64b and the radial oil passage 65a (lubricating oil feed oil passages) which are formed in the housing 20 and are configured to feed the lubricating oil to the speed reducer accommodating chamber, the ball bearing 52 (first bearing) which is provided inside the motor casing 45 and is configured to rotatably support the motor drive shaft 48, the ball bearing 300 (second bearing) which is provided inside the speed reducer accommodating chamber and is configured to rotatably support the motor drive shaft 48 and the wave generator 37, and the seal member 310 configured to seal between the motor casing 45 and the motor drive shaft 48.

Specifically, the ball bearing 300 is arranged inside the speed reducer accommodating chamber being the lubricating chamber. When a bearing is arranged in the motor accommodating chamber being the dry room, an expensive lubricating oil enclosed type bearing is required to be used so as to ensure lubrication. On the other hand, inside the lubricating chamber, the lubricating oil is fed thereto. Thus, the open type ball bearing 300 can be used so that the cost can be reduced.

(19) In the actuator for a link mechanism for an internal combustion engine described above in the item (18), the wave gear type speed reducer 21 includes the wave generator 37 (speed reducer input unit) coupled to the motor drive shaft 48. The cylindrical portion 371b is provided so as to extend to the drive motor side of the wave generator 37 in the axial direction. The ball bearing 300 is provided between the outer periphery of the cylindrical portion 371b and the speed reducer accommodating chamber.

Thus, the single ball bearing 300 serves as both the bearing for the motor drive shaft 48 and the bearing for the wave generator 37, and thus the number of components can be reduced.

(20) In the actuator for a link mechanism for an internal combustion engine described above in the item (19), the seal member 310 is positioned on a radially inner side of the cylindrical portion 371b.

Thus, the seal member 310 and the ball bearing 300 can be arranged so as to overlap each other as viewed in the radial direction, and thus the axial size can be reduced.

(21) In the actuator for a link mechanism for an internal combustion engine described above in the item (20), the ball bearing 300 is the open type ball bearing.

Thus, the lubricating oil for lubricating the wave gear type speed reducer 21 and the second control shaft 11 is likely to move into the sliding portion, and thus a lubricating property can be ensured.

(22) In the actuator for a link mechanism for an internal combustion engine described above in the item (21), the ball bearing 300 is formed to have a diameter larger than a diameter of the ball bearing 52.

Thus, the bearing capacity can be sufficiently ensured.

(23) In the actuator for a link mechanism for an internal combustion engine described above in the item (18), the ball bearing 300 is provided on the side of the wave gear type speed reducer 21, which is closer to the drive motor 22 in the axial direction.

Thus, the ball bearing 300 is supported at a position closer to the drive motor 22, thereby being capable of suppressing the increase in the axial size toward the second control shaft 11 while suppressing the deformation of the motor drive shaft 48.

[Other Embodiments] Although the description has been given above based on each of the embodiments, another configuration may be used without being limited to the embodiments described above. For example, in the first embodiment, the inner ring 302 of the ball bearing 300 is press-fitted and fixed over the outer periphery of the cylindrical portion 371b. However, the outer ring 301 may be press-fitted and fixed into the housing 20.

(2-9) In the actuator for a link mechanism for an internal combustion engine described above in the item (1-4), the outer ring 301 is press-fitted and fixed into the housing 20.

In this manner, for example, the cover 28, the motor casing 45, and the ball bearing 300 can be formed into a module, and hence the wave gear type speed reducer 21 can be easily assembled.

Further, although this actuator for a link mechanism for an internal combustion engine is used for the mechanism configured to variably change the compression ratio of the internal combustion engine in each of the embodiments, this actuator can be used for a link mechanism for a variable valve timing mechanism configured to variably change actuation timing of an intake valve or an exhaust valve. Still further, although the example in which the open type ball bearing is used as the bearing has been described, the bearing is not limited to the open type ball bearing and may also be a bearing having a resin band. A grease enclosed type, a roller bearing, or the like may be used. Still further, although the example in which the motor drive shaft 48 and the main body portion 371 are press-fitted and joined has been described, the motor drive shaft 48 and the main body portion 371 may be fastened through serration coupling or with a bolt and a nut.

The embodiments of the present invention have been described above. The embodiments of the present invention described above are intended for easy understanding of the present invention, and do not limit the present invention. It is apparent that the present invention can be changed and modified without departing from the spirit thereof and encompasses equivalents thereof. Further, within a range in which the above-mentioned problems can be at least partially solved or within a range in which the effects are at least partially obtained, a suitable combination or omission of the components recited in the claims and described in the specification is possible.

The present application claims a priority to Japanese Patent Application No. 2015-012414 filed on Jan. 16, 2015. All disclosed contents including the specification, the claims, the drawings, and the abstract of Japanese Patent Application No. 2015-012414 filed on Jan. 16, 2015 are incorporated herein by reference in their entirety.

REFERENCE SIGNS LIST 1 piston, 3 upper link, 4 crankshaft, 4a crank pin, 5 lower link, 7 control link, 9 coupling mechanism, 10
  first control shaft, 11 second control shaft, 12 second control link, 13 arm link, 20 housing, 20a opening groove portion, 21 wave gear type speed reducer, 22 drive motor, 23 shaft portion main body, 23a first journal portion, 23c second journal portion, 23d first stepped portion, 23e
second stepped portion, 24b stepped portion, 26 thrust plate, 27 first circular spline, 27a internal teeth, 28 cover, 28a motor shaft through hole, 29 accommodation chamber, 30 support hole, 30a bearing hole, 30b speed-reducer side through hole, 30c stepped hole edge portion, 31
retention hole, 32 angle sensor, 36 flex spline, 36a
external teeth, 37 wave generator, 38 second circular spline, 38a internal teeth, 38b flange, 38c bolt through hole, 41 bolt, 42 second thrust plate, 43 bolt, 44a feed pipe, 44b drain pipe, 45 motor casing, 48 motor drive shaft, 48a one end portion, 48b opposite end portion, 52 bearing, 281
end surface, 281a plate accommodating portion, 281b bearing accommodating portion, 281c bottom surface, 281d
seal accommodating portion, 281e bearing accommodating portion, 281f bottom surface, 300 ball bearing, 301 outer ring, 302 inner ring, 303 ball, 310 seal member, 371 main body portion, 371a drive-motor side side surface, 371b
cylindrical portion, 371c tubular portion, 372 ball bearing, 400 bearing, 500 bearing

The invention claimed is:

1. An actuator for a link mechanism for an internal combustion engine, the actuator comprising:
  a control link having one end portion coupled to the link mechanism for the internal combustion engine;
  a control shaft configured to change a posture of the control link through rotation;
  a housing configured to rotatably support the control shaft; and
  a wave gear type speed reducer configured to transmit a rotation speed of an output shaft of a drive motor to the control shaft after reducing the rotation speed,
  the wave gear type speed reducer comprising:
    a circular spline provided in the housing and having internal teeth;
    a flex spline arranged on an inner side of the circular spline and having external teeth formed on an outer periphery, the flex spline being configured to transmit the rotation to the control shaft;
    a wave generator configured to be rotated by the output shaft of the drive motor to warp the flex spline into an ellipsoidal shape so as to partially mesh the external teeth of the flex spline with the internal teeth of the circular spline, and configured to rotate a meshed portion between the flex spline and the circular spline; and a rolling bearing provided between the wave generator and the housing or a motor housing for the drive motor and including an inner ring fixed to the wave generator, the actuator further comprising a restricting portion configured to restrict movement of an outer ring of the rolling bearing to both sides in an axial direction with respect to the housing or the motor housing for the drive motor.

2. The actuator for a link mechanism for an internal combustion engine according to claim 1, wherein the link mechanism for the internal combustion engine is a variable compression ratio mechanism configured to change an engine compression ratio by changing at least one of a top dead center position or a bottom dead center position of a piston of the internal combustion engine through actuation of the control link.

3. The actuator for a link mechanism for an internal combustion engine according to claim 2,
wherein the wave generator comprises a cylindrical portion provided so as to extend in an axial direction toward the drive motor, and
wherein the rolling bearing is provided between the cylindrical portion and the housing.

4. The actuator for a link mechanism for an internal combustion engine according to claim 3, wherein the inner ring is press-fitted and fixed over an outer periphery of the cylindrical portion.

5. The actuator for a link mechanism for an internal combustion engine according to claim 4,
wherein one axial end of the outer ring of the rolling bearing is brought into abutment in the axial direction against a stepped portion formed on the housing so as to restrict movement of the outer ring toward the one axial end, and
wherein an opposite axial end of the outer ring of the rolling bearing is brought into abutment in the axial direction against a plate fixed to the housing so as to restrict movement of the outer ring toward the opposite axial end.

6. The actuator for a link mechanism for an internal combustion engine according to claim 5, wherein the plate is provided between the circular spline and the rolling bearing.

7. The actuator for a link mechanism for an internal combustion engine according to claim 6, wherein the plate is fixed to the housing with a bolt.

8. The actuator for a link mechanism for an internal combustion engine according to claim 2, wherein the rolling bearing is provided on a side of the wave generator, which is closer to the drive motor in the axial direction.

9. The actuator for a link mechanism for an internal combustion engine according to claim 3, wherein the rolling bearing has an outer diameter larger than an inner diameter of the circular spline.

10. An actuator for a link mechanism for an internal combustion engine, the actuator comprising:
a control link having one end portion coupled to the link mechanism for the internal combustion engine;
a control shaft configured to change a posture of the control link through rotation;
a housing configured to rotatably support the control shaft;
a drive motor configured to rotationally drive a motor output shaft; and
a wave gear type speed reducer configured to transmit a rotation speed of the motor output shaft to the control shaft after reducing the rotation speed,
the wave gear type speed reducer comprising:
a circular spline fixed to the housing and having internal teeth;
a flex spline, which is arranged on an inner side of the circular spline, is radially elastically deformed, and has external teeth formed on an outer periphery, the flex spline being configured to rotate together with the control shaft;
a wave generator configured to be rotated by the output shaft of the drive motor to warp the flex spline into an ellipsoidal shape so as to partially mesh the external teeth of the flex spline with the internal teeth of the circular spline and to rotate a meshed portion between the flex spline and the circular spline; and
a rolling bearing provided between the wave generator and the housing,
wherein the rolling bearing is configured to receive loads in both axial directions exerted on the wave generator.

11. The actuator for a link mechanism for an internal combustion engine according to claim 10,
wherein an outer ring of the rolling bearing is fixed to the housing, and
wherein an inner ring of the rolling bearing is fixed to a cylindrical portion of the wave generator, which is extended in an axial direction.

12. The actuator for a link mechanism for an internal combustion engine according to claim 11, wherein the inner ring is press-fitted and fixed over an outer periphery of the cylindrical portion.

13. The actuator for a link mechanism for an internal combustion engine according to claim 11,
wherein one axial end of the outer ring of the rolling bearing is brought into abutment in the axial direction against a stepped portion formed on the housing so as to restrict movement of the outer ring toward the one axial end, and
wherein an opposite axial end of the outer ring of the rolling bearing is brought into abutment in the axial direction against a plate fixed to the housing so as to restrict movement of the outer ring toward the opposite axial end.

14. The actuator for a link mechanism for an internal combustion engine according to claim 13, wherein the plate is provided between the circular spline and the rolling bearing.

15. The actuator for a link mechanism for an internal combustion engine according to claim 13, wherein the plate is fixed to the housing with a bolt.

16. The actuator for a link mechanism for an internal combustion engine according to claim 10, wherein the link mechanism for the internal combustion engine is a variable compression ratio mechanism configured to change an engine compression ratio by changing at least one of a top dead center position or a bottom dead center position of a piston of the internal combustion engine through actuation of the control link.

* * * * *